Jan. 6, 1942.　　　R. B. ANDRUS　　　2,268,689
TRACTOR OPERATED LOADER
Filed May 10, 1940　　　2 Sheets-Sheet 1

INVENTOR.
RICHARD B. ANDRUS
BY Martin E. Anderson
ATTORNEY.

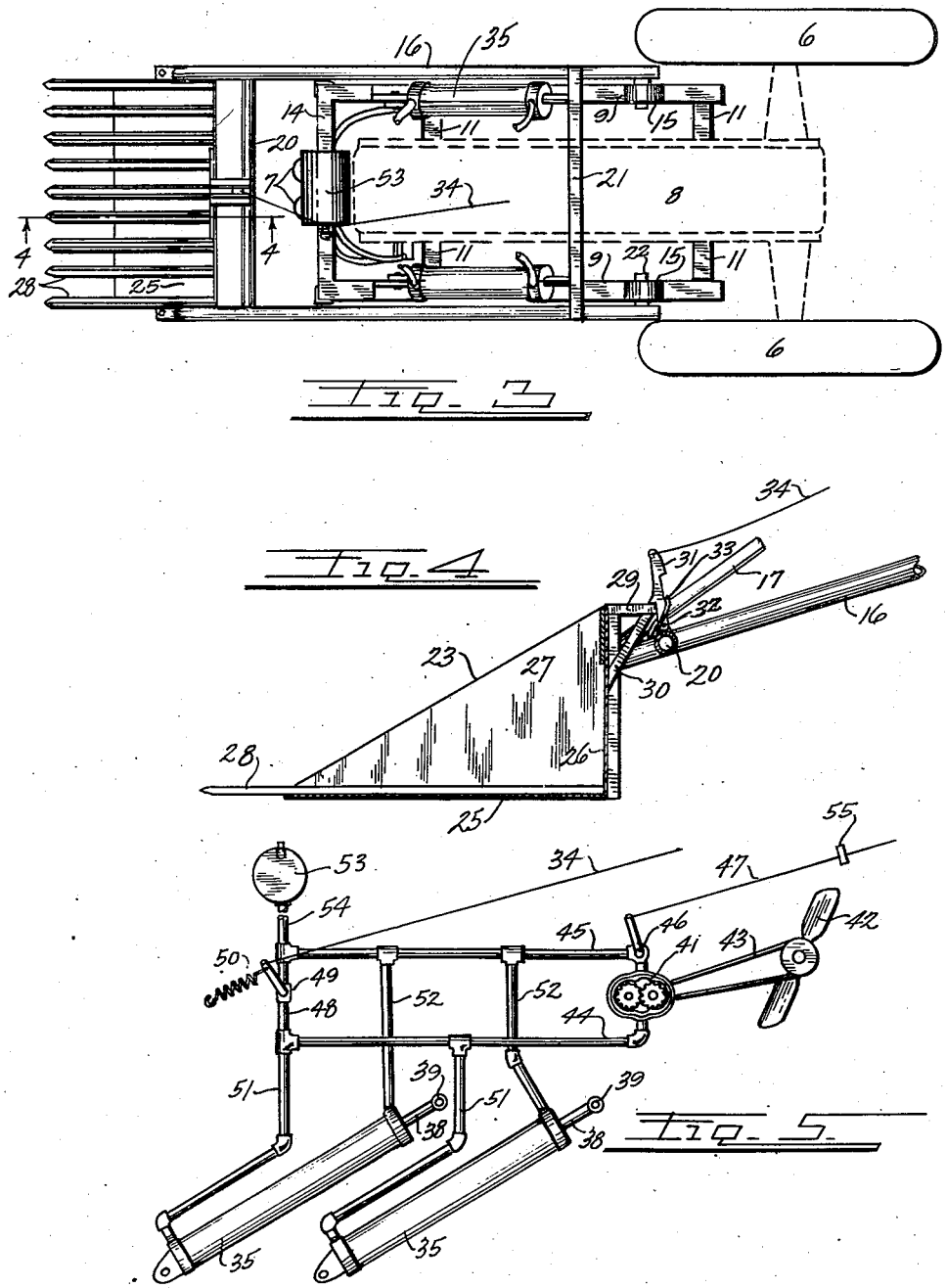

Patented Jan. 6, 1942

2,268,689

UNITED STATES PATENT OFFICE 2,268,689

TRACTOR OPERATED LOADER

Richard B. Andrus, Boulder County, Colo.

Application May 10, 1940, Serial No. 334,336

4 Claims. (Cl. 214—140)

This invention relates to improvements in tractor operated loaders and has reference more particularly to a loader constructed in such a manner that it can be readily attached to a farm tractor and operated by power derived from the latter.

It often happens that it is desirable to load material into a truck or wagon and since this necessitates the elevating of the material to a considerable height, it requires the expenditure of a great amount of energy and when the loading is done manually, it is very tiring.

On farms where cattle are kept, there is always an accumulation of manure which must be loaded onto trucks and distributed on the fields. On other farms where beets are raised, this requires the beets to be loaded into trucks and in addition to these two specific examples, there are, of course, often times many other materials to be loaded.

It is the object of this invention to produce a simple and substantial mechanism that can be readily attached to an ordinary farm tractor and operated by power derived from the latter for the purpose of loading material from the ground onto trucks.

This invention, briefly described, comprises a rectangular frame having means for attaching it to a tractor and having pivotally attached to each side thereof a truss arm to the outer end of which a large shovel or equivalent device is pivotally secured. The attachment carries a pump which can be driven from the fan of the tractor and which serves to deliver oil or other liquid under pressure to hydraulic cylinders connected with the truss arms in such a way that when liquid under pressure is introduced, the truss arms will rotate about their pivots thereby lifting the shovel to the desired elevation, whereupon it can be dumped by suitable mechanism.

The above and other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 3 is a top plan view of the mechanism showing the position of the tractor by broken lines;

Figure 4 is a section taken on line 4—4, Figure 3, and shows the mechanism for latching the shovel in operative position; and Figure 5 is a diagrammatic representation of the several elements comprising the hydraulic operating means.

Figure 1:
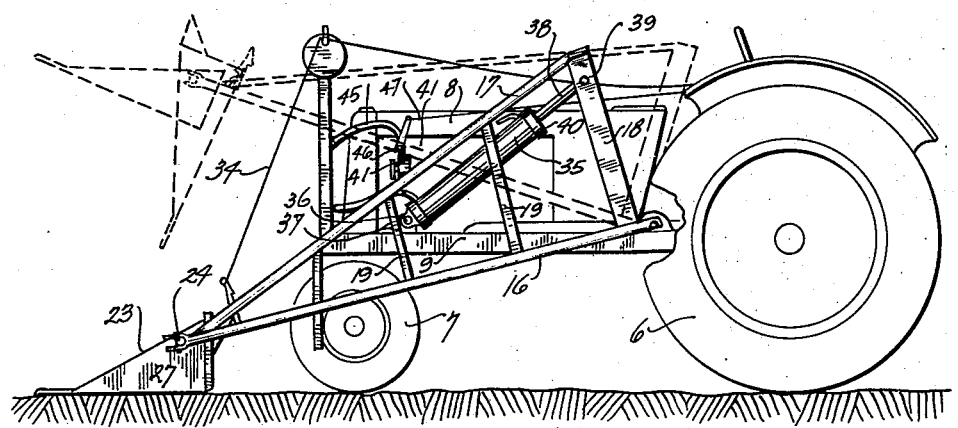
Figure 1 is a side elevation of a tractor showing the loading device in place thereon.
Figure 2:
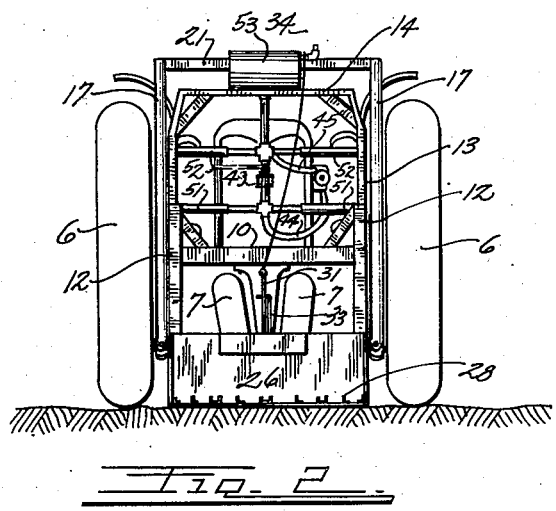
Figure 2 is a front elevation of the mechanism shown in Figure 1.

In the drawings reference numeral 6 designates the rear wheels of a farm tractor and reference numeral 7 the front wheels thereof. The body of the tractor has been shown in outline and is identified by reference numeral 8. Since the tractor does not form a part of this invention, but is shown merely for the purpose of better explaining the operation and construction of the loading mechanism, it will not be described with any greater particularity than necessary for the purpose of properly defining this invention.

The mechanism comprising this invention is secured to a frame having parallel side members 9 connected at one end by a transverse member 10. Connector elements 11 extend between the sides 9 and the tractor and are secured to openings provided for this purpose in practically all farm tractors. In the present embodiment, a guide frame comprising side members 12 and 13 and a top member 14, is electrowelded or otherwise secured to the front end of the frame comprising members 9 and 10. Adjacent the open end of the frame, each side member 9 is provided with a bearing which has been designated by reference numeral 15, and pivotally mounted in these bearings is a frame comprising two triangular trusses, each comprising a base 16, an inclined side member 17 and a vertical end member 18. The members 16 and 17 are connected by transverse braces 19. Near the apexes of the trusses, a transverse member 20 is secured and a similar transverse member 21 connects the upper corners of the triangles. It is now apparent that the frame comprising the two triangular truss arms can be rocked about the pivots 22 that are associated with the bearings 15. A large shovel or scraper, which has been designated in its entirety by reference numeral 23 is provided with trunnions 24 that are rotatably connected with the ends of members 16 as shown more specifically in Figure 1. The shovel consists of a sheet metal member having a bottom 25, an end 26 and two parallel sides 27 which are of triangular shape. The trunnions 24 project from the side members 27. Spaced teeth 28 are attached to the inner surface of the bottom to facilitate the handling of material such as manure and other fibrous material. Extending rearwardly from the end 26 is a bar 29 which is held against movement relative to the end 26 by means of a diagonal brace 30. The two members 29 and 30 form part of a latch whose other member consists of a pawl 31 attached to the transverse bar 20 by means of a pivot 32. A spring 33 exerts a force tending to move the pawl in a counter-clockwise direction when viewed as in Figure 4. A rope or wire 34 is secured to the end of pawl 31 and extends over the guide frame and terminates adjacent the seat on which the operator rides so that by exerting a pull on the wire, the operator can release the shovel which will then tilt about its trunnions into a position substantially like that indicated by dotted lines in Figure 1. When the truss arms are lowered to the ground, the shovel will automatically resume the position shown in Figure 1.

For the purpose of operating this loader by means of power derived from the tractor engine, a hydraulic mechanism has been provided which will now be described. Positioned on each side of the tractor body is a cylinder 35 which has its lower end pivotally connected at 36 to a bracket 37 that, in turn, is secured to the side members 9. Positioned inside of these cylinders are pistons which are connected to the ends of piston rods 38. The outer ends of the piston rods are pivotally connected to the vertical truss members 18 by means of pivots 39. The caps 40 which close the upper ends of the cylinders, are provided with stuffing boxes of ordinary construction through which the piston rods 38 extend. It will hereinafter appear that the liquid that comes in contact with the upper cap 40 is never under pressure and therefore there is very little tendency for it to leak and the stuffing box can therefore be omitted in certain cases if desired. When the shovel is in the position shown by full lines in Figure 1, the pistons are at the bottom of the cylinders.

Since it is desired to operate this mechanism by means of power derived from the engine and by means of the pistons and cylinders just described, it is necessary to provide a liquid under pressure and for this purpose a gear pump 41 has been secured to the tractor and connected with the fan 42 by means of a belt 43. Whenever the fan operates the pump will therefore also operate and continue to circulate liquid through a closed conduit circuit, which comprises a pipe 44 connected to the delivery port of the pump and the pipe 45 connected with the intake port of the pump. A stop cock or other valve 46 is positioned in the conduit 45 for the purpose of controlling the flow of liquid therethrough. This valve can be opened and closed by exerting the appropriate force on a rod 47 that extends to a point adjacent the seat of the operator. The two conduits 44 and 45 are interconnected by a conduit 48, which is provided with a valve 49 that is held in open position by means of a spring 50. Whenever valve 49 is open and valve 46 is also open, the liquid will circulate through pipes 44, 48 and 45, but if the valve 49 is closed, the liquid can not return to the intake port of the pump and will therefore build up a pressure in pipe 44. It will be seen from Figure 5 that pipes 51 connect the pipe 44 with the lower ends of cylinders 35, while pipes 52 connect the upper ends of cylinders with the return pipe 45. An expansion tank 53 is positioned at an elevated point and is connected with the return pipe 45 by means of a pipe 54. It will be explained here that the system comprising all of the pipes shown and the cylinder compartments on both sides of the pistons, which are located in the cylinders 35, are full of liquid which also partially fills the expansion tank 53. When valve 49 is closed, the liquid delivered by the pump will pass through pipes 51 to the lower ends of the cylinders 35 and move the piston rods upwardly, the liquid contained in the cylinders above the pistons will return to the pipe 45 through pipes 52. It will therefore be seen that when the pump is operating and valve 49 is closed, the piston rods can be moved upwardly and since these are connected with the triangular arms, previously described, at pivots 39, the frame comprising these truss arms will be rotated in a clockwise direction from the full line position to the dotted line position shown in Figure 1. When the parts arrive at the position shown by dotted lines, valve 46 can be closed, whereupon the oil or other liquid ceases to circulate and this holds the pistons in any desired position. After the truss arms have been raised, the operator exerts a pull on the rope 34, thereby releasing the latch that holds the shovel and permits the latter to tilt downwardly, whereupon the load will be discharged into a truck or into any other vehicle by means of which it can be transported. It is contemplated to provide the mechanism with an automatic means for closing the valve 46 when the truss arms have reached a predetermined elevation and this can be readily effected by providing the rod 47 with an adjustable stop 55 that will be engaged with the transverse connecting bar 21 when the parts reach a predetermined elevation.

In the drawings the several pipes connecting the pump with the cylinders and with the expansion tank have been indicated by appropriate numerals, but the actual arrangement of pipes can be varied from that illustrated and the arrangement shown must therefore not be considered in a limiting, but rather in an illustrative sense.

The present mechanism does not interfere with the operation of the tractor and the latter can therefore be used in the ordinary way, even when this mechanism is in position thereon. The power of the tractor can be used for forcing the shovel into the material to be loaded and after the load has been accumulated and the parts moved to broken line position, the load can be transported to any desired position. Since the mechanism that operates the loader is driven hydraulically from the fan of the engine, there will always be pressure available for operating the mechanism whenever the engine is running and the loader can therefore be operated while the engine is standing still, as well as while the engine is moving.

Attention is called in particular to the very simple construction of this mechanism and to the fact that it can be readily attached and/or removed from a tractor by means of the supporting elements 11. Due to the simplicity of this device and to its ruggedness, it can be constructed at a very reasonable cost and is capable of resisting rough usage and is therefore well adapted to be sold to farmers and other parties for connection to tractors.

Although a specific embodiment has been illustrated, it is evident that variations can be made in form and size without departing from the invention, and it is to be understood that the specific construction shown is merely illustrative and can be varied as may be found desirable as long as the modified construction is within the scope of the appending claims.

In the embodiment illustrated and described above the pump 41 has been shown and described as driven from the fan. It is pointed out that the pump may be connected with the engine in any other manner as the only requirement is that the pump shall be driven by the engine and operate whenever the engine is running and that the operation of the loader shall be entirely independent of the travel of the tractor.

Attention is also directed to the fact that the loading mechanism extends very little above the top of the tractor and in fact may be designed so as to be positioned entirely below the highest point of the tractor. Due to the low construction, the loader may be employed inside of buildings or in any place where the tractor can go.

Having described the invention what is claimed as new is:

1. A power operated loader comprising in combination, an open ended frame adapted to enclose the front and sides of a tractor, means extending inwardly from the frame for attaching it to a tractor, in a horizontal position, a lifter arm consisting of a truss pivotally attached at its lower corner to each side of the frame adjacent its open end, a connector bar joining the lifter arms at a point forward of the closed end of the frame, the arms extending forwardly beyond the connector bar, a load carrying device positioned between the arms at the front of said connector bar, and means operated by power derived from the tractor engine and comprising elements connected with each side of the frame and with the corresponding lifter arms for turning the latter about their pivots.

2. A power operated loader comprising in combination, an open ended frame adapted to enclose the front and sides of a tractor, means extending inwardly from the frame for attaching it to a tractor in a horizontal position, a lifter arm consisting of a truss pivotally attached at its lower corner to each side of the frame adjacent its open end, a connector bar joining the lifter arms at a point forward of the closed end of the frame, the arms extending forwardly beyond the connector bar, a load carrying device positioned between the arms at the front of said connector bar, and hydraulic means for turning the lifter arms about their pivots, said means comprising a piston and cylinder operatively connected with each side of the frame and with the corresponding lifter arm.

3. A power operated loader, comprising in combination, an open ended frame adapted to enclose the front and sides of a tractor, means extending inwardly from the sides of the frame for attaching it to a tractor, a triangular truss arm positioned alongside each side of the frame with its plane perpendicular to the plane of the frame, means for pivotally connecting the lower base angle of each truss arm with a frame side, near the open end thereof a transverse bar connecting the truss arms at a point forward of the closed end of the frame and to the rear of the vertexes of the truss arms, guides extending both above and below the plane of the frame adjacent each corner thereof, and a hydraulic mechanism for turning the truss arms about their pivots, comprising a piston and a cylinder associated with each side of the frame and with the corresponding truss arm.

4. A power operated loader, comprising in combination, a three-sided open ended frame adapted to enclose the sides and front end of a tractor, means extending inwardly from the frame for attaching it to a tractor, a lifting frame comprising two spaced truss arms of substantially triangular shape and a transverse bar joining the two, said lifting frame enclosing the front and sides of the first frame, the planes of the triangles being perpendicular to the plane of the frame, the lower corners of the triangular lifting arms being pivotally attached to the sides of the first frame near the open end thereof, and hydraulic means for tilting the load carrying frame about its pivotal connection with the first mentioned frame, said last named means comprising a cylinder and a piston, one end of the cylinder being connected with the frame and the piston being connected with the upwardly extending member of the corresponding truss arm.

RICHARD B. ANDRUS.